W. T. WOOD.
CULINARY IMPLEMENT.
APPLICATION FILED JAN. 5, 1912.
1,024,240.
Patented Apr. 23, 1912.
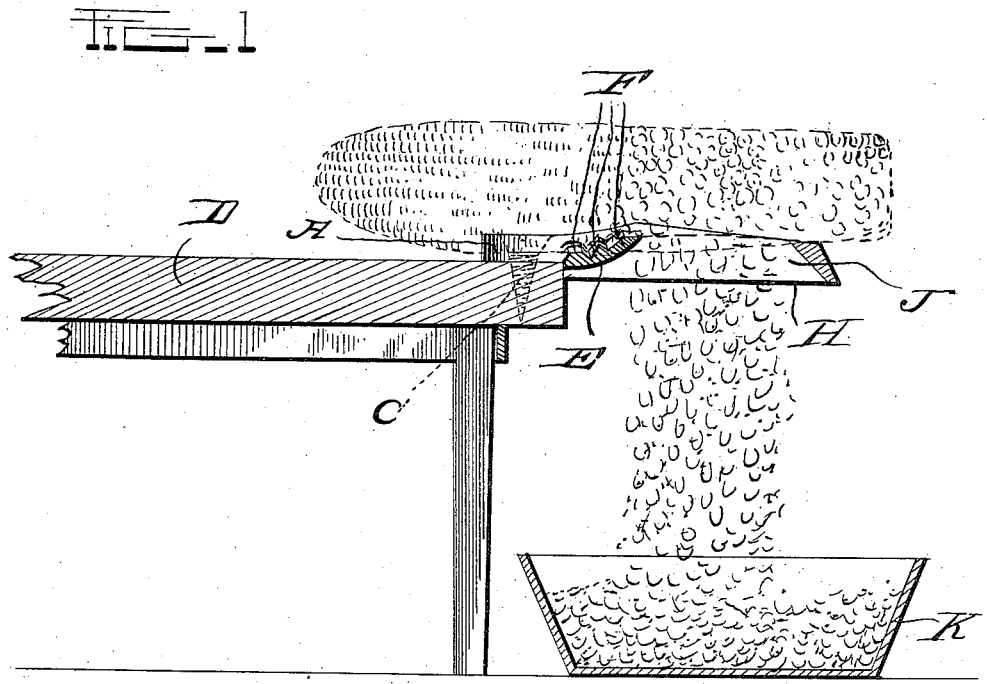
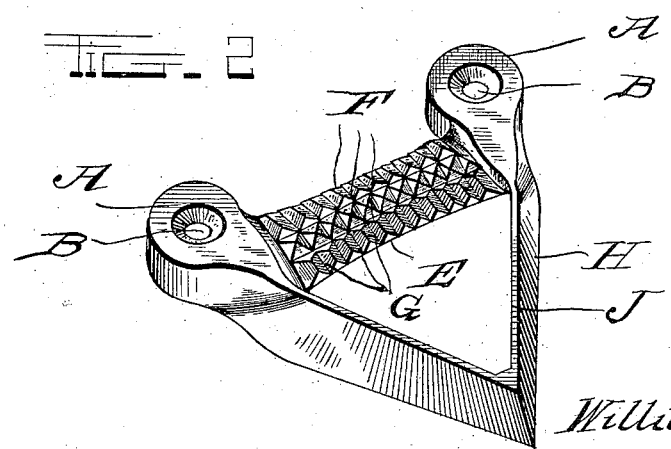
William T. Wood
INVENTOR

UNITED STATES PATENT OFFICE.

WILLIAM THOMAS WOOD, OF NASHVILLE, TENNESSEE.

CULINARY IMPLEMENT.

1,024,240.  Specification of Letters Patent.  Patented Apr. 23, 1912.

Application filed January 5, 1912. Serial No. 669,610.

*To all whom it may concern:*

Be it known that I, WILLIAM T. WOOD, a citizen of the United States, residing at Nashville, in the county of Davidson and State of Tennessee, have invented certain new and useful Improvements in Culinary Implements, of which the following is a specification.

My invention relates to an improved culinary implement, the object being the provision of a simple, cheap and durable implement by means of which the kernels of corn can be quickly and perfectly removed and discharged entirely free of their covering whereby a useful, desirable and efficient kitchen implement is provided.

To attain the desired object, the invention consists of an implement of the character and for the purpose stated, made in a single piece of casting or stamping and embodying means for cutting open the grains of corn to expose the kernel and removing intact the entire kernel.

The invention also consists of a culinary implement embodying novel features of construction and arrangement of parts, substantially as disclosed herein.

Figure 1 represents a longitudinal sectional view of the implement in position upon a table, and showing also an ear of corn being operated upon and a receiving receptacle for the kernels, the illustration demonstrating the manner of using the implement, and Fig. 2 represents a perspective view of the complete implement detached and showing its novel construction.

The implement is of the simplest and cheapest possible construction and is preferably of cast metal comprising the pair of attaching ears A, formed with openings B, to receive screws C, for securing the implement to a table D, or other suitable support, the ears being parallel and connected by the rib E, which is curved upwardly with reference to the ears and formed with a series of rows of teeth F, whose sharp edges G are disposed longitudinally and the implement terminates in the angle shaped portion H, the upper edges J of which are sharpened to produce a cutting or shearing portion.

In operation, the ear of corn fits or seats snugly in the implement and when pressed down and pushed forward the grains are cut open by the teeth and the kernels are exposed and after this the angle portion or member bunches or draws the kernels together and forces them out of their covering and the kernels only fall through the implement into a suitable receptacle K. The curving of the rib forms a seat for the ear of corn and guides the corn with reference to the teeth and angular cutter, in order that the teeth will properly cut the grains and expose the kernels for the removing action of the angular cutter.

The implement will only remove the kernel of the corn and this is accomplished in a rapid and perfect manner and the implement will fill a long-felt want by reason of its cheapness, durability and easy mode of using.

I claim:—

1. A culinary implement of the character and for the purpose stated consisting of a pair of attaching ears, a rib connecting the ears and having teeth and an open portion forming a cutter for bunching and removing the kernels after the action of the teeth.

2. A culinary implement, having attaching means, teeth arranged between and connecting said attaching means for cutting the grains of corn and a member for bunching and drawing the kernels from the grains of corn.

3. A culinary implement composed of a single casting having a pair of attaching ears, a transverse connecting rib having teeth, and an open cutting portion; the teeth cutting the grain of corn and the open cutter removing and discharging the kernels.

4. A culinary implement having a curved portion to fit the ear of corn and formed with teeth to cut the grains and a V-shaped terminating cutter to remove and discharge the kernels after the action of the teeth.

5. A culinary implement having a pair of attaching ears, a connecting rib formed with teeth and curved to conform to the ear of corn and an angular open cutter for bunching and discharging the kernels after the action of the teeth.

6. A culinary implement, comprising a triangular shaped member, the legs of which are formed with sharpened edges and the base of which is provided with cutting means.

7. A culinary implement, composed of a single piece of material having a cutting device arranged at its rear end and having its sides converging to a point.

8. A culinary implement having a triangular shaped configuration and provided with cutting devices along its legs and a serrated cutting base.

In testimony whereof I affix my signature in presence of two witnesses.

WILLIAM THOMAS WOOD.

Witnesses:
   GEO. F. BLACKIE,
   THOMPSON BOND.

---

Copies of this patent may be obtained for five cents each, by addressing the "Commissioner of Patents, Washington, D. C."